L. Rundell,
Hay Fork.
No. 38,420. Patented May 5, 1863.
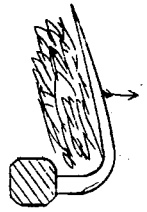
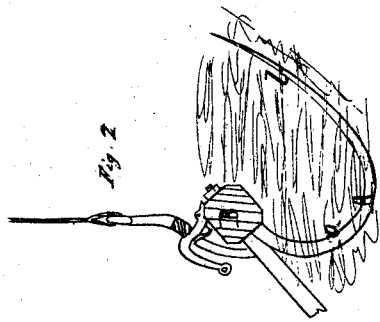
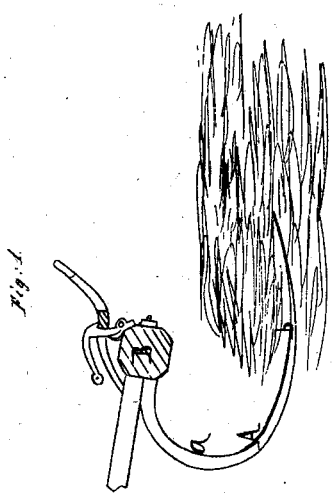
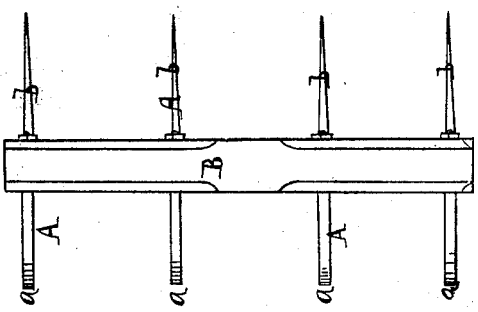
Inventor
Leman Rundell
Witnesses

UNITED STATES PATENT OFFICE.

LUMAN RUNDELL, OF NEW BALTIMORE, NEW YORK.

IMPROVEMENT IN HAY-ELEVATING FORKS.

Specification forming part of Letters Patent No. 38,420, dated May 5, 1863.

*To all whom it may concern:*

Be it known that I, LUMAN RUNDELL, of New Baltimore, in the county of Greene and State of New York, have invented a new and useful Improvement in Hay-Forks; and I do hereby declare that the following is a full, clear, and exact description of the same, reference being had to the accompanying drawings, forming a part of this specification, in which—

Figure 1 represents a transverse vertical section of my invention in the position which it assumes on being rocked into the hay. Fig. 2 shows a similar section of the same in the act of being hoisted up with a load of hay. Fig. 3 is a plan or top view of the same. Fig. 4 is a diagram of a hay-fork of the ordinary construction.

Similar letters of reference in the three views indicate corresponding parts.

The tines A of my fork extend back of the head B in a sharp curve or semicircle, $a$, and thence in a flat curve, $b$, to the points. By thus commencing the curves at the points the operation of entering the tines into the hay is considerably facilitated. Ordinary tines, which extend in straight lines, or nearly so, from the points to the bends, as shown in Fig. 4 of the drawings, have to be pressed into the hay by mere pressure. If it should be attempted to rock them in, the fulcrum would be so far from the point that considerable power would be required to rock the fork and the tines would be subjected to a great strain at their butt-ends, rendering the same liable to break.

In rocking my fork into the hay the fulcrum on which the tines rock is close to the points, and consequently a small power is sufficient to work the fork and the strain on the tines is reduced. The semicircular curves $a$ form a recess to receive and hold the hay while the fork is hoisted up.

By referring to Fig. 2 of the drawings it will be observed that the strain exerted on the tines by the load during the action of hoisting is nearly in line with the direction in which the butt-ends of said tines enter the head, and consequently no lateral strain is exerted on said butt-ends and the liability of snapping the tines is considerably reduced.

With tines of the ordinary construction the center of gravity of the load is at a considerable distance from the butt-ends, and in hoisting a strain is exerted on said tines, tending to break the same off at those points where they enter the head.

My fork can be constructed and sold at the same price as forks of the ordinary construction, and their durability is unsurpassed.

Having thus fully described my invention, what I claim as new, and desire to secure by Letters Patent, is—

Extending the tines of a hay-fork back of the head in a sharp curve and thence to their points in a flat curve, substantially as herein shown and described, and in such relation to the handle and loop from which the fork is suspended in elevating the same that said tines can be easily rocked into the hay, and that in elevating the load lodges in the sharp curve, where it exerts almost no lateral strain on the butt-ends of the tines, and consequently the liability of snapping the same at the place where they enter the head is obviated.

LUMAN RUNDELL.

Witnesses:
M. S. PARTRIDGE,
DANIEL ROBERTSON.